United States Patent
Sakamoto

(10) Patent No.: US 8,069,889 B2
(45) Date of Patent: Dec. 6, 2011

(54) PNEUMATIC TIRE

(75) Inventor: Sachio Sakamoto, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 685 days.

(21) Appl. No.: 12/262,505

(22) Filed: Oct. 31, 2008

(65) Prior Publication Data
US 2009/0159166 A1 Jun. 25, 2009

(30) Foreign Application Priority Data

Dec. 20, 2007 (JP) .................................. 2007-328192

(51) Int. Cl.
*B60C 11/00* (2006.01)
(52) U.S. Cl. ............ 152/209.16; 152/209.11; 152/523; D12/605
(58) Field of Classification Search ............. 152/209.16, 152/209.11, 523; D12/605
See application file for complete search history.

(56) References Cited

U.S. PATENT DOCUMENTS

| | | | | |
|---|---|---|---|---|
| 5,800,642 A | * | 9/1998 | Ohya | 152/209.1 |
| 2003/0041939 A1 | * | 3/2003 | Allison et al. | 152/209.1 |
| 2008/0093000 A1 | * | 4/2008 | Fujioka | 152/209.21 |

FOREIGN PATENT DOCUMENTS

JP 07-32818 2/1995
* cited by examiner

*Primary Examiner* — Matthew Daniels
*Assistant Examiner* — Jacob Thomas Minskey
(74) *Attorney, Agent, or Firm* — Fish & Richardson P.C.

(57) ABSTRACT

Protrusions 11 are provided in a buttress portion 20, the protrusions 11 are composed of a center portion 11a extending from the groove bottom 4 of the transverse grooves 2 toward the tire rotational axis and side portions 11b, the center portion 11a and the side portions 11b are integrally formed, the side portions 11b extend from the same cross-sectional height as, that of the center portion toward the tire rotational axis, the protrusions 11 extend at least to a virtual line 22 in which the inner most belt layer 21a is virtually extended to the buttress portion 20, and the width W of the side portions 11b is 7% to 30% of the depth D of the transverse grooves 2, and the thickness L of the protrusions 11 on the virtual line 22 is 1 mm to 10 mm.

4 Claims, 7 Drawing Sheets

PNEUMATIC TIRE

CROSS-REFERENCE TO RELATED APPLICATION

This application claims the benefit of priority based on Japanese Patent Application No.2007-328192, the entire same contents of which are incorporated by reference herein.

BACKGROUND OF THE INVENTION

1. Field of the Invention

The present invention relates to a pneumatic tire with improved handling and stability and traction performance, as well as improved uneven wear-resistant performance.

2. Description of the Prior Art

At shoulder portions of a tread of a pneumatic tire, uneven wear is likely to occur. In particular, in the case of the pneumatic tire provided with a row of blocks at the shoulder portion, such uneven wear called toe-and-heel wear is likely to occur. For example, as the pneumatic tire provided with the row of blocks at the shoulder portion, the pneumatic tire disclosed in the Patent Document 1 (Patent document 1: Unexamined Japanese Laid-Open Patent Publication No. 7-32818, FIG. 1) is known.

SUMMARY OF THE INVENTION

In general, the uneven wear is inhibited by reducing the depth of the transverse grooves that form the block or by narrowing the width of the transverse grooves. However, since this may degrade other performance of the tire (for example, drainage performance), the uneven wear could not be inhibited enough. Although auxiliary blocks are provided in the transverse grooves in order to improve the handling and stability in the tire of the Patent Document 1, it does not inhibit the uneven wear.

The object of the present invention is to provide a pneumatic tire with improved handling and stability and traction performance, as well as improved uneven wear-resistant performance.

The pneumatic tire of the present invention has characteristics in that it is the pneumatic tire with transverse grooves opened to the grounding edge and extending to the inner side in the tire width direction formed on a shoulder portion of a tread between a main groove extending in the tire circumferential direction and the grounding edge and provided with a row of blocks or a rib on the shoulder portion, wherein the protrusions are provided in a buttress portion from the grounding edge to the position where the width becomes the maximum in the cross-section in the tire width direction, the protrusions are composed of a center portion extending from the groove bottom of the transverse grooves toward the tire rotational axis and side portions that are on both sides of the center portion in the tire circumferential direction, and the center portion and the side portions are integrally formed, the side portions extend from the same cross-sectional height as that of the center portion toward the tire rotational axis, the protrusions extend at least to a virtual line in which the innermost belt layer is virtually extended to the buttress portion in the direction of the tire rotational axis, W that is the width of the side portions is 7% to 30% of D that is the depth of the transverse grooves, and L that is the thickness of the protrusions on the virtual line is 1 mm to 10 mm.

In the buttress portion, rigidity is relatively low compared with the tread or the bead portion. With the load, the buttress portion is liable to bend. However, since the protrusions are provided in the buttress portion, the rigidity of the block or the rigidity of the rib is enhanced, and the motion of the block or of the rib is inhibited. As a result, the uneven wear of the block or of the rib is inhibited and the handling and stability is also improved. Further, when driving on snowy roads, snow column shearing force increases with the protrusions and the traction performance is improved.

The pneumatic tire of the present invention has characteristics in that it is the pneumatic tire provided with a row of blocks or a rib formed by a main groove extending in the tire circumferential direction and the transverse grooves opened to the grounding edge, wherein the protrusions are provided in a buttress portion from the grounding edge to the position where the width becomes the maximum in the cross-section in the tire width direction, the protrusions are composed of a center portion extending from the groove bottom of the transverse grooves toward the tire rotational axis and side portions that are on both sides of the center portion in the tire circumferential direction, and the center portion and the side portions are integrally formed, the side portions extend from the position that is more of the tread side than the groove bottom toward the tire rotational axis, and the protrusions extend at least to a virtual line in which the innermost belt layer is virtually extended to the buttress portion in the direction of the tire rotational axis.

By extending the side portions of the protrusions toward the tread, the uneven wear is further inhibited and the handling and stability is also improved. The snow column shearing force also increases and the traction performance is improved.

The pneumatic tire of the present invention has characteristics in that it is the pneumatic tire provided with a row of blocks or a rib formed by a main groove extending in the tire circumferential direction and the transverse grooves opened to the grounding edge, wherein the protrusions are provided in a buttress portion from the grounding edge to the position where the width becomes the maximum in the cross-section in the tire width direction, the protrusions are composed of a center portion extending from the groove bottom of the transverse grooves toward the tire rotational axis and side portions that are on both sides of the center portion in the tire circumferential direction, and the center portion and the side portions are integrally formed, the side portions extend from the position that is more of the tread side than the groove bottom toward the tire rotational axis, the protrusions extend at least to a virtual line in which the innermost belt layer is virtually extended to the buttress portion in the direction of the tire rotational axis, and the thickness of the center portion on the virtual line is greater than that of the side portions on the virtual line.

By making the center portion of the protrusion thicker than the side portion, the snow column shearing force increases and the traction performance is improved.

DESCRIPTION OF THE PREFERRED EMBODIMENTS

Figure 1:
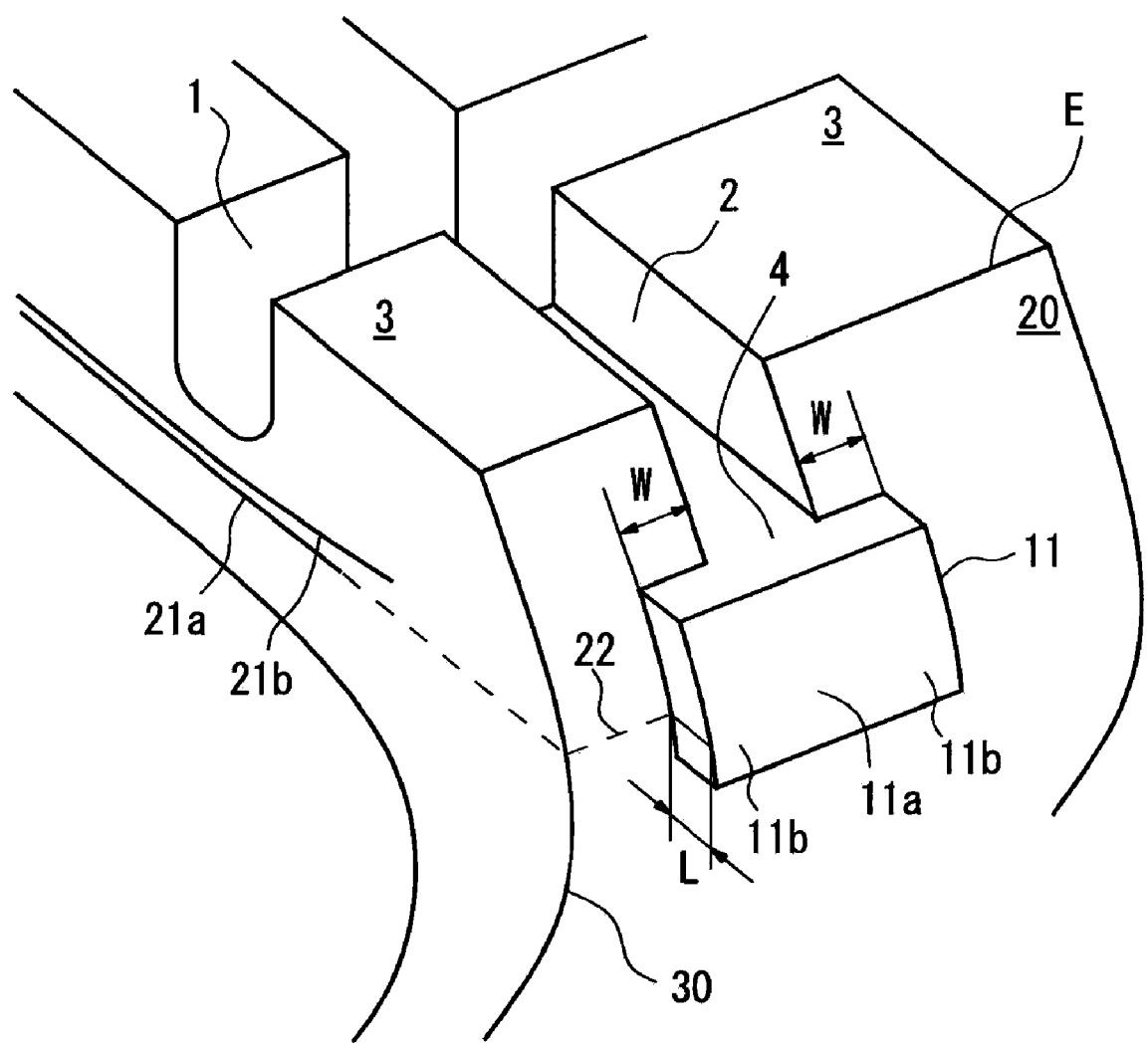
FIG. 1 is a view showing a part of the shoulder portion of the pneumatic tire related to the present invention.

Hereinafter, explanation on embodiments for carrying out the pneumatic tire of the present invention is made using drawings. FIG. 1 is a view showing the shoulder portion of the pneumatic tire related to the present invention. Transverse grooves 2 extending inner side in the tire width direction are formed on a shoulder portion of a tread between the main groove 1 extending in the tire circumferential direction and the grounding edge E. The transverse grooves 2 are connected to a main groove 1, and a row of blocks 3 is formed on the shoulder portion of the tread. Like in the conventional tires, belt layers 21a and 21b are inserted between the tread and the carcass (not illustrated) for reinforcing the tire.

A protrusion 11 is provided with a buttress portion 20. The protrusion 11 is composed of a center portion 11a extending from the groove bottom 4 of the transverse groove 2 toward a tire rotational axis and side portions 11b in both sides in the tire circumferential direction of the center portion 11a. The center portion 11a and the side portions 11b are integrally formed. The side portions 11b extend from the same cross-sectional height as that of the center portion 11a toward the tire rotational axis. In addition, the protrusion 11 extends at least to the virtual line 22 virtually extending the innermost belt layer 21a to the buttress portion 20 in the direction of the tire rotational axis.

The tread of the tire is reinforced by the belt layers 21a and 21b. The portion closer to the rotational axis in the side portions of the tire is reinforced by a bead filler (not illustrated). Thus, the rigidity of the buttress portion 20 between the tread and the bead filler is relatively low and the buttress portion 20 is likely to bend with a load. Therefore, by providing the protrusions 11, the rigidity of the block 3 in the tire width direction and in the tire rotational direction is enhanced thereby inhibiting the motion of the block 3. As a result, the uneven wear of the block 3 is inhibited and the handling and stability is enhanced. Further, when driving on snowy roads, by the protrusions 11, the snow column shearing force increases and the traction performance is improved. Here, in the present application, the buttress portion 20 refers to the region covering from the grounding edge E to the position 30 where the width becomes largest in the cross-section in the tire width direction.

Although W that is the width of the side portions 11b of the protrusion 11 may be different in right and left, it is preferably 7% to 30% of the D that is the depth of the transverse groove 2. When the width W is less than 7% of D that is the depth of the transverse groove 2, the effect of enhancing the rigidity may be small. When the width W exceeds 30% of D that is the depth of the transverse groove 2, the rigidity of the block 3 of becomes so high that the uneven wear is likely to occur to the contrary. Here, D that is the depth of the transverse grove 2 is the depth measured at a position inside in the width direction by 5 mm from the grounding edge E.

L that is the thickness of the protrusion 11 on the virtual line 22 is preferably 1 mm to 10 mm. When the thickness L is less than 1 mm, the effect of enhancing the rigidity of the block 3 maybe small. On the other hand, even when the thickness L exceeds 10 mm, the effect of inhibiting uneven wear is not improved greatly. Also, even when the protrusion 11 does not extend to the virtual line 22, the effect of enhancing the rigidity of the block 3 is small and the uneven wear resistant performance is not improved greatly.

Figure 2:
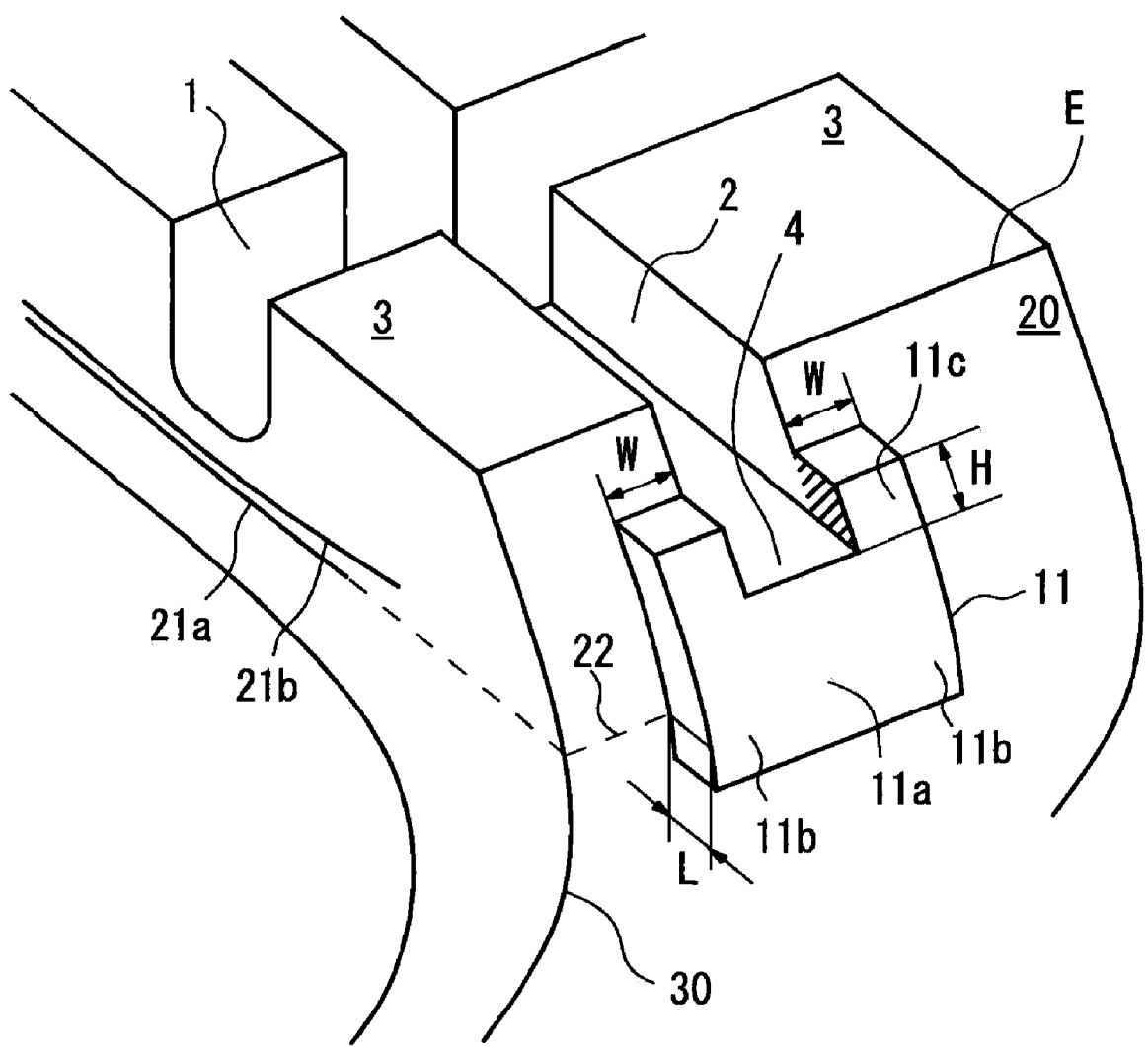
FIG. 2 is a view showing a part of the shoulder portion of the pneumatic tire related to the present invention.

In another embodiment shown in FIG. 2, the side portion 11b of the protrusion 11 extends from the position that is more of a tread side than the groove bottom 4 of the transverse groove 2 toward the tire rotational axis. Since the side portion 11b extends to the tread side and is provided with an extension portion 11c, the motion of the block 3 is further inhibited. The uneven wear at the block 3 is further inhibited and the handling and stability is improved further. Also, with the extension portion 11c of the side portion 11b extended to the tread side, the snow column shearing force increases and the traction performance is improved.

H that is the length of the extension portion 11c of the side portion 11b is preferably not greater than 60% of the depth D of the transverse groove 2 and more preferably 5% to 60% of the depth D of the transverse groove 2. With the rotation of a tire, traction occurs and the shearing force in the direction of falling to the transverse groove acts on to the block 3 and the extension portion 11c. In addition, shearing rigidity of the extension portion 11c is in inverse proportion to the area (L×H) of a portion at which the extension portion 11c continues to the transverse groove 2 (hatched in FIG. 2). Therefore, when the length H exceeds 60% of the thickness L of the transverse groove 2, the shearing force of the block 3 is degraded and the motion of the block 3 becomes so big that uneven wear may not be inhibited. On the other hand, when the length H is less than 5% of the depth D of the transverse groove 2, the traction performance is not so improved.

Figure 3:
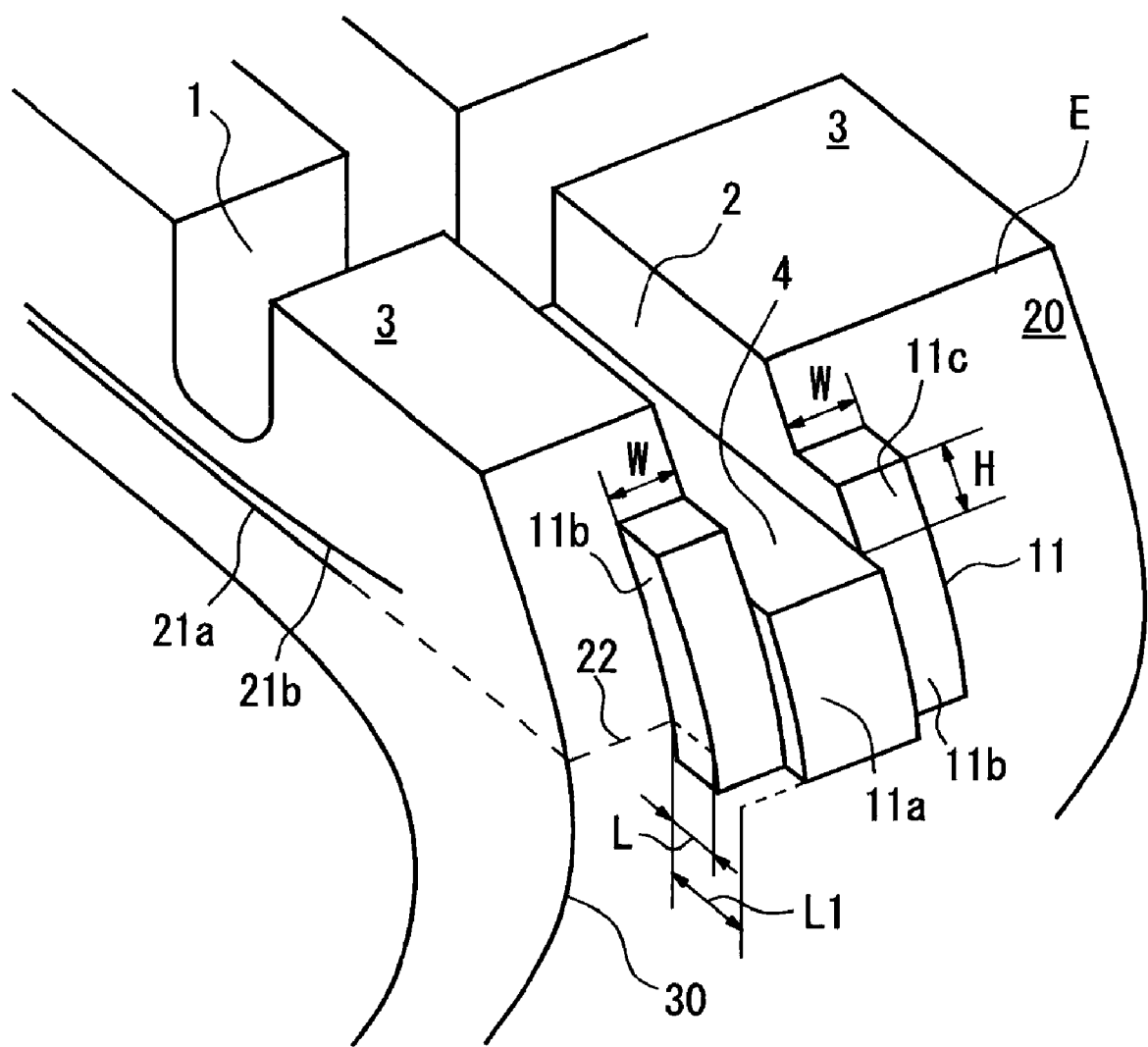
FIG. 3 is a view showing a part of the shoulder portion of the pneumatic tire related to the present invention.

Further, in another embodiment as shown in FIG. 3, L1 that is the thickness of the center portion 11a of the protrusion 11 on the virtual line 22 is made thicker than L that is thickness of the side portion 11b of the protrusion 11 on the virtual line 22. By making the center portion 11a thicker, the traction on snowy roads increases. Here, it is preferable that the distance of L1-L is set to be 2 mm to 5 mm. When the distance of L1-L is less than 2 mm, the traction does not increase greatly. On the other hand, when the distance of L1-L exceeds 5 mm, when the width of the transverse groove 2 is not constant for reducing noise, roundness of the tire is lowered and the uniformity is degraded since the mass of the individual protrusion 11 is different. Moreover, the shape of the protrusion 11 becomes complicated, which may cause the manufacturing failure at the time of vulcanization molding.

Figure 4:
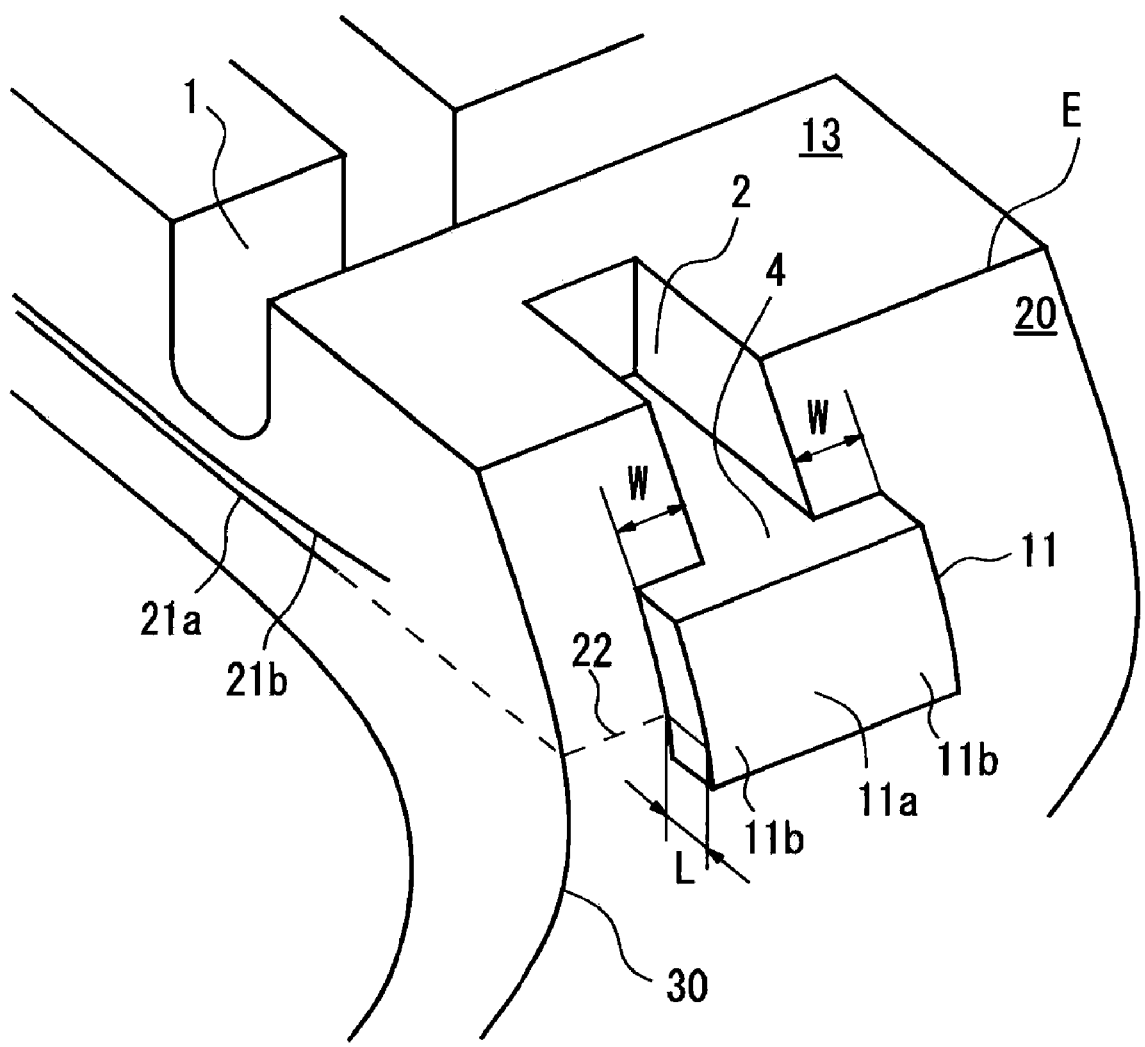
FIG. 4 is a view showing a part of the shoulder portion of the pneumatic tire related to the present invention.
Figure 5:
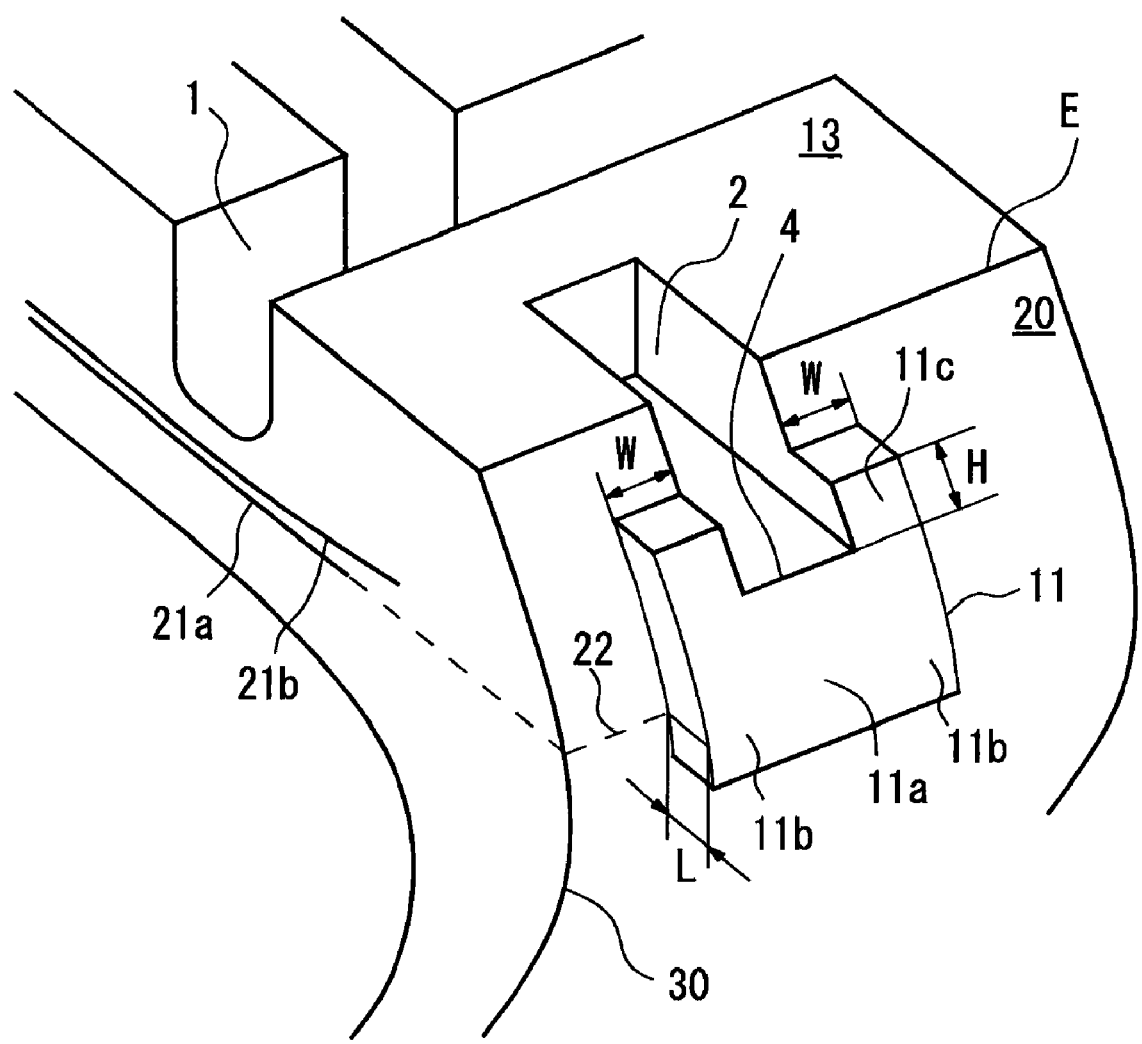
FIG. 5 is a view showing a part of the shoulder portion of the pneumatic tire related to the present invention.
Figure 6:
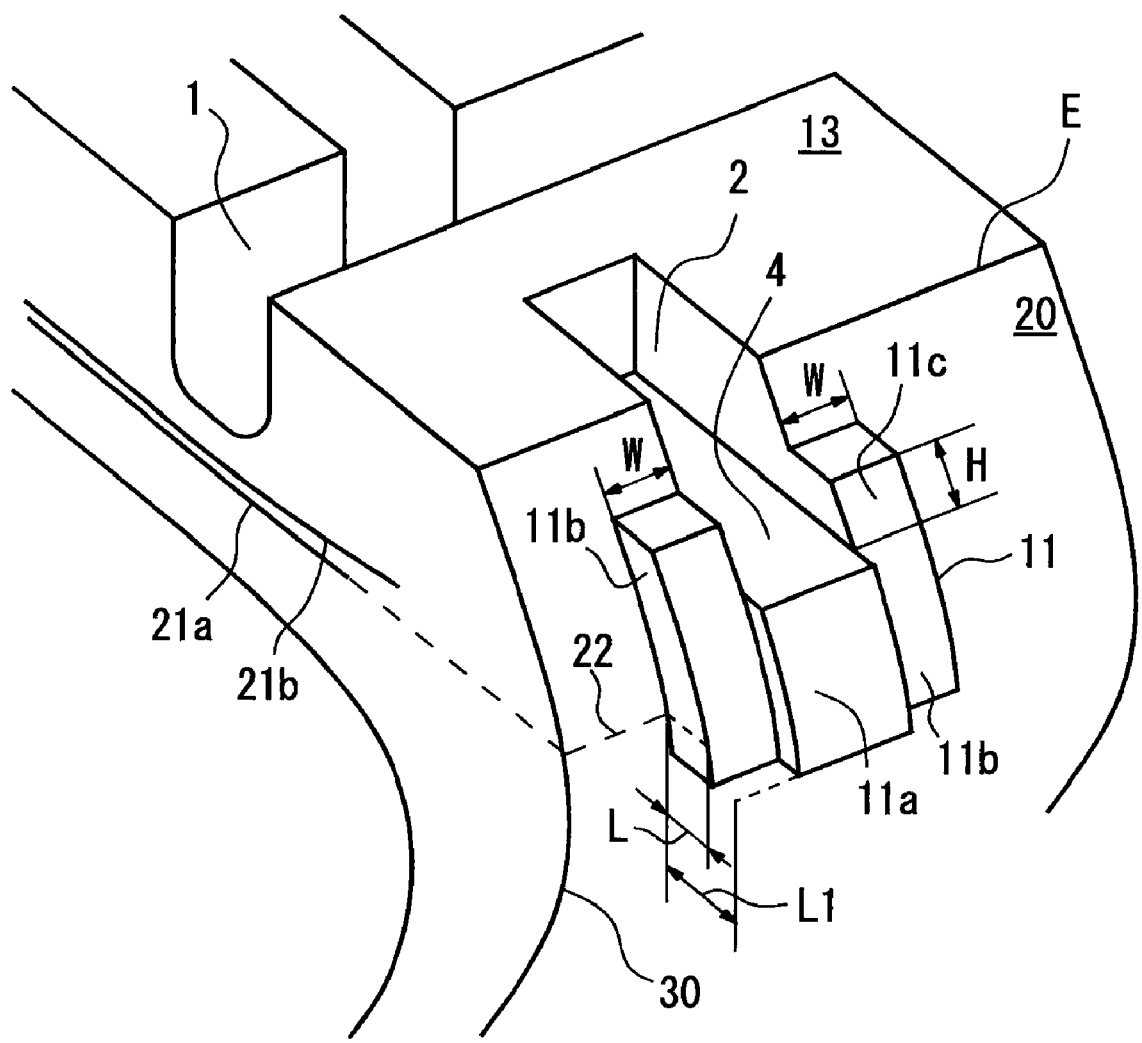
FIG. 6 is a view showing a part of the shoulder portion of the pneumatic tire related to the present invention.

Although the examples were shown in which the row of blocks was arranged at the shoulder portion, the tire may be the one in which the transverse grooves 2 are not connected to the main groove 1 but to form a lug groove and the rib with the lug groove was formed at the shoulder portion. FIGS. 4 to 6 are examples in which the row of blocks in FIGS. 1 to 3 is replaced by a rib 13 with a lug groove. In these cases, too, as above mentioned, the uneven wear resistant performance at the shoulder portion is improved and the handling and stability and the traction performance are improved.

EXAMPLE

Figure 7:
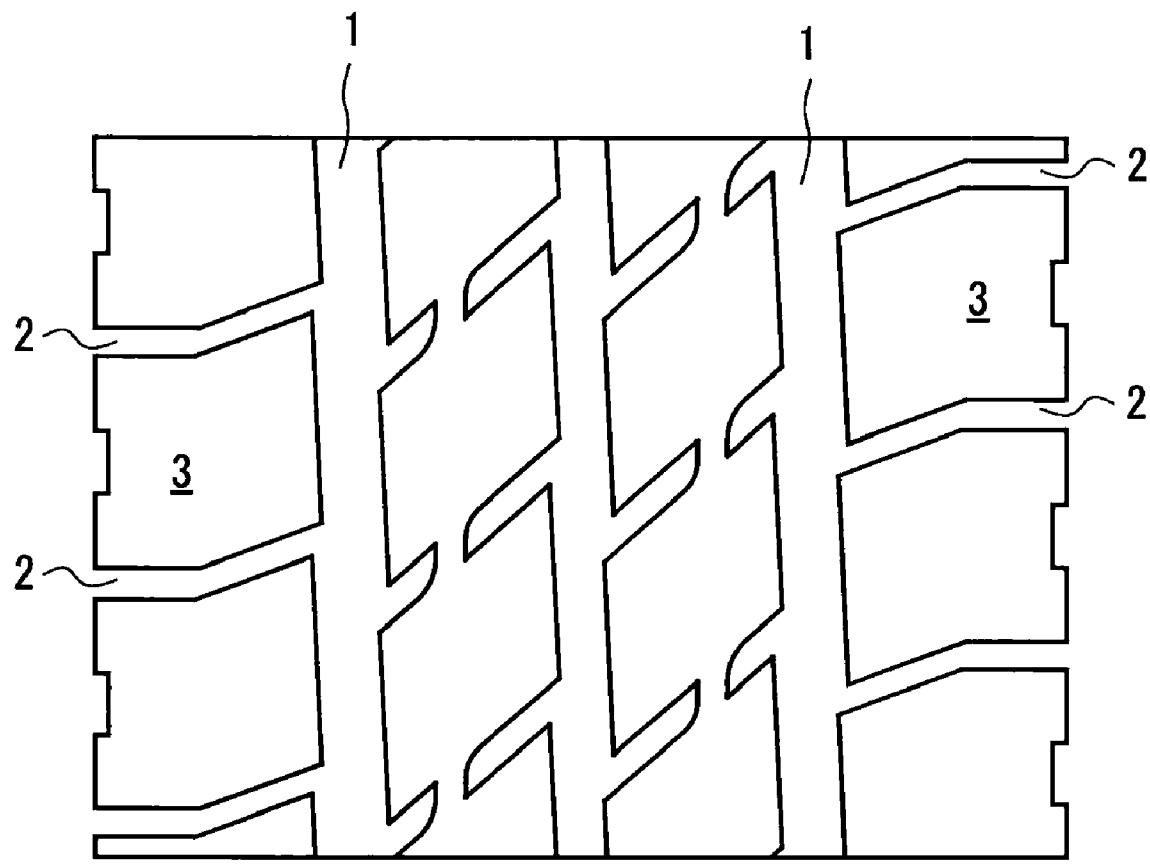
FIG. 7 is a view showing the tread pattern of the pneumatic tire related to the Examples.

Tires for Examples and those for Comparative Examples related to the present invention were manufactured and evaluation was made on each of them. Tread patterns are as shown in FIG. 7, and the tires of the Examples are provided with protrusions whose shapes are as shown in Table 1, however, the tire of Comparative Example 1 is not provided with protrusions. The tire size is LT265/75R16 and the evaluation was made by attaching to a rim whose size is 16×7J. For information, air pressure was 420 kPa at front wheels, while 520 kPa at rear wheels.

The evaluation results are as shown in Table 1. Uneven wear resistant performance is the amount of the uneven wear of the block after driving 18000 km by attaching to a pick-up truck (engine capacity 6600 cc, diesel engine) and its value is obtained by measuring the inner side in the width direction by 5 mm from the grounding edge. Dry handling and stability is the value of sensory evaluation by attaching to the same vehicle and driving on dry asphalt roads. Here, air pressure was 420 kPa at the front wheels and 520 kPa at the rear wheels. Snow traction performance is traction coefficient obtained by measuring based on ASTM F-1805. Every evaluated value was shown by index letting the value of the Comparative Example 1 as 100 and the larger numerical values show excellence.

TABLE 1

| | | Example 1 | Example 2 | Example 3 | Comparative Example 1 |
|---|---|---|---|---|---|
| protrusion size (mm) | Shape | FIG. 1 | FIG. 2 | FIG. 3 | — |
| | Width of side portions W (mm) | 3.0 | 3.0 | 3.0 | — |
| | length of extension portion of side portions H (mm) | — | 2.5 | 2.5 | — |
| | thickness of side portions L (mm) | 5.0 | 5.0 | 5.0 | — |
| | thickness of center portion L1 (mm) | 5.0 | 5.0 | 8.0 | — |
| uneven wear resistant performance | | 105 | 108 | 108 | 100 |
| dry handling and stability | | 103 | 106 | 106 | 100 |
| snow traction performance | | 103 | 106 | 108 | 100 |

Depth of transverse groove D: 11.2 mm

What is claimed is:

1. A pneumatic tire with transverse grooves opened to the grounding edge and extending to the inner side in the tire width direction formed on a shoulder portion of a tread that is between a main groove extending in the tire circumferential direction and the grounding edge and provided with a row of blocks or a rib oil the shoulder portion, wherein the protrusions are provided in a buttress portion from the grounding edge to the position where the width becomes the maximum in the cross-section in the tire width direction, the protrusions axe composed of a center portion extending from the groove bottom of the transverse grooves toward the tire rotational axis and side portions that are on both sides of the center portion in the tire circumferential direction, and the enter portion and the side portions are integrally formed, the side portions extend from the position that is more of the tread side than the groove bottom toward the tire rotational axis, the protrusions extend at least to a virtual line in which the innermost belt layer is virtually extended to the buttress portion in the direction of the tire rotational axis, the width W of the side portions is 7% to 30% of D that is the depth of the transverse grooves, and L that is the thickness of the protrusions on the virtual line is 1 mm to 10 mm, wherein H that is the length of extension portions extended more to the tread side than the groove bottom of the side portions is not greater than 60% of D that is the depth of the transverse grooves.

2. The pneumatic tire as set forth in claim 1 wherein H that is the length of the extension portions extended more do the tread side than the groove bottom of the side portions is 5% to 60% of D that is the depth of the transverse grooves.

3. A pneumatic tire with transverse grooves opened to the grounding edge and extending to the inner side in the tire width direction formed on a shoulder portion of a tread that is between a main groove extending in the tire circumferential direction and the grounding edge and provided with a row of blocks or a rib oil the shoulder portion, wherein the protrusions are provided in a buttress portion from the grounding edge to the position where the width becomes the maximum in the cross-section in the tire width direction, the protrusions axe composed of a center portion extending from the groove bottom of the transverse grooves toward the tire rotational axis and side portions that are an both sides of the center portion in the tire circumferential direction, and the center portion and the side portions are integrally formed, the side portions extend from the position that is more of the tread side than the groove bottom toward the tire rotational axis, the protrusions extend at least to a virtual line in which the innermost belt layer is virtually extended to the buttress portion in the direction of the tire rotational axis, the thickness of the center portion on the virtual line is greater than the thickness of the side portions on the virtual line, the width W of the side portions is 7% to 30% of D that is the depth of the transverse grooves, L that is the thickness of the protrusions on the virtual line is 1 mm to 10 mm, and L1 that is the thickness of the center portion is 2 mm to 15 mm, wherein H that is the length of extension portions extended more to the tread side than the groove bottom of the side portions is not greater than 60% of D that is the depth of the transverse grooves.

4. The pneumatic tire as set forth in claim 3 wherein H that is the length of the extension portions extended more do the tread side than the groove bottom of the side portions is 5% to 60% of D that is the depth of the transverse grooves.

* * * * *